United States Patent [19]

Ikuta et al.

[11] Patent Number: 4,673,971
[45] Date of Patent: Jun. 16, 1987

[54] HALFTONE DOT FORMATION

[75] Inventors: Kunio Ikuta, Nagaokakyo; Katsunori Yamada, Kyoto, both of Japan

[73] Assignee: Dainippon Screen Mfg. Co., Ltd., Kyoto, Japan

[21] Appl. No.: 804,931

[22] Filed: Dec. 5, 1985

[30] Foreign Application Priority Data

Jul. 12, 1984 [JP] Japan ................... 59-260121

[51] Int. Cl.⁴ ............................................. H04N 1/46
[52] U.S. Cl. ........................................ 358/75; 358/78; 358/283
[58] Field of Search ................ 358/75.78, 283, 280

[56] References Cited

U.S. PATENT DOCUMENTS 4,350,996  9/1982  Rosenfeld ........................ 358/75
4,456,924  6/1984  Rosenfeld ........................ 358/75
4,499,489  2/1985  Gall ................................. 358/75
4,543,613  9/1985  Sakamoto ........................ 358/75
4,547,814  10/1985 Hirosawa ......................... 358/75

FOREIGN PATENT DOCUMENTS 2026283  1/1983  United Kingdom .
2157119  10/1985 United Kingdom .

Primary Examiner—Michael A. Masinick
Attorney, Agent, or Firm—Lowe, Price, LeBlanc Becker & Shur

[57] ABSTRACT

In reproducing halftone dot images, the appearance of moire effect is suppressed by slightly and randomly disarranging the positions of halftone dots to be recorded from the normal position in each unit halftone dot area, or by slightly and randomly distorting the halftone dots.

11 Claims, 14 Drawing Figures

FIG.10
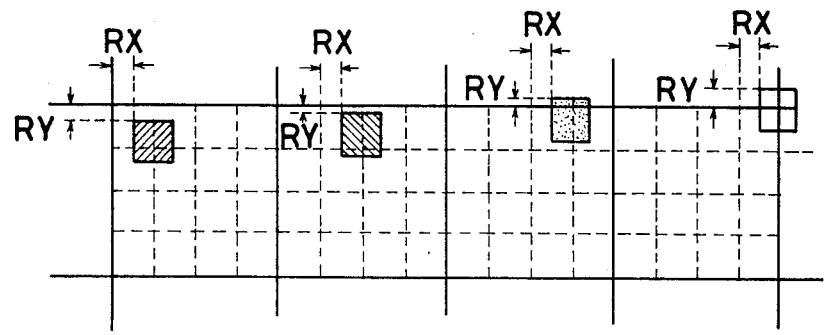
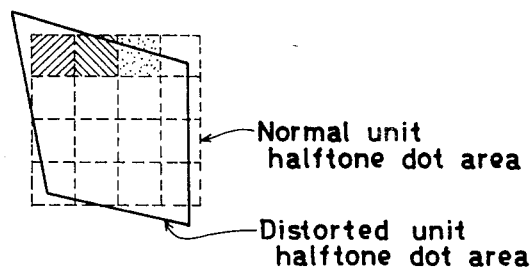
- Normal unit halftone dot area
- Distorted unit halftone dot area
FIG.11
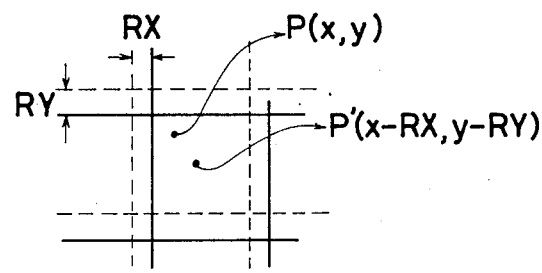

FIG.12

A compartment

| | | | | | | | | |
|---|---|---|---|---|---|---|---|---|
| $RX(^0_0{}^0_0)$ $RY(^0_0{}^0_0)$ | $RX(^0_1{}^0_0)$ $RY(\ \cdot\cdot\ )$ | $RX(^0_2{}^0_0)$ $RY(\ \cdot\cdot\ )$ | $RX(^0_3{}^0_0)$ $RY(\ \cdot\cdot\ )$ | $RX(^1_0{}^0_0)$ $RY(\ \cdot\cdot\ )$ | $RX(^1_1{}^0_0)$ $RY(\ \cdot\cdot\ )$ | $RX(^1_2{}^0_0)$ $RY(\ \cdot\cdot\ )$ | $RX(^1_3{}^0_0)$ $RY(\ \cdot\cdot\ )$ | $RX(^2_0{}^0_0)$ $RY(\ \cdot\cdot\ )$ |
| $RX(^0_0{}^0_1)$ $RY(\ \cdot\cdot\ )$ | $RX(^0_1{}^0_1)$ $RY(\ \cdot\cdot\ )$ | $RX(^0_2{}^0_1)$ $RY(\ \cdot\cdot\ )$ | $RX(^0_3{}^0_1)$ $RY(\ \cdot\cdot\ )$ | $RX(^1_0{}^0_1)$ $RY(\ \cdot\cdot\ )$ | $RX(^1_1{}^0_1)$ $RY(\ \cdot\cdot\ )$ | $RX(^1_2{}^0_1)$ $RY(\ \cdot\cdot\ )$ | $RX(^1_3{}^0_1)$ $RY(\ \cdot\cdot\ )$ | $RX(^2_0{}^0_1)$ $RY(\ \cdot\cdot\ )$ |
| $RX(^0_0{}^0_2)$ $RY(\ \cdot\cdot\ )$ | $RX(^0_1{}^0_2)$ $RY(\ \cdot\cdot\ )$ | $RX(^0_2{}^0_2)$ $RY(\ \cdot\cdot\ )$ | $RX(^0_3{}^0_2)$ $RY(\ \cdot\cdot\ )$ | $RX(^1_0{}^0_2)$ $RY(\ \cdot\cdot\ )$ | $RX(^1_1{}^0_2)$ $RY(\ \cdot\cdot\ )$ | $RX(^1_2{}^0_2)$ $RY(\ \cdot\cdot\ )$ | $RX(^1_3{}^0_2)$ $RY(\ \cdot\cdot\ )$ | $RX(^2_0{}^0_2)$ $RY(\ \cdot\cdot\ )$ |
| $RX(^0_0{}^0_3)$ $RY(\ \cdot\cdot\ )$ | $RX(^0_1{}^0_3)$ $RY(\ \cdot\cdot\ )$ | $RX(^0_2{}^0_3)$ $RY(\ \cdot\cdot\ )$ | $RX(^0_3{}^0_3)$ $RY(\ \cdot\cdot\ )$ | $RX(^1_0{}^0_3)$ $RY(\ \cdot\cdot\ )$ | $RX(^1_1{}^0_3)$ $RY(\ \cdot\cdot\ )$ | $RX(^1_2{}^0_3)$ $RY(\ \cdot\cdot\ )$ | $RX(^1_3{}^0_3)$ $RY(\ \cdot\cdot\ )$ | $RX(^2_0{}^0_3)$ $RY(\ \cdot\cdot\ )$ |
| $RX(^0_0{}^1_0)$ $RY(\ \cdot\cdot\ )$ | $RX(^0_1{}^1_0)$ $RY(\ \cdot\cdot\ )$ | $RX(^0_2{}^1_0)$ $RY(\ \cdot\cdot\ )$ | $RX(^0_3{}^1_0)$ $RY(\ \cdot\cdot\ )$ | $RX(^1_0{}^1_0)$ $RY(\ \cdot\cdot\ )$ | $RX(^1_1{}^1_0)$ $RY(\ \cdot\cdot\ )$ | $RX(^1_2{}^1_0)$ $RY(\ \cdot\cdot\ )$ | $RX(^1_3{}^1_0)$ $RY(\ \cdot\cdot\ )$ | $RX(^2_0{}^1_0)$ $RY(\ \cdot\cdot\ )$ |
| $RX(^0_0{}^1_1)$ $RY(\ \cdot\cdot\ )$ | $RX(^0_1{}^1_1)$ $RY(\ \cdot\cdot\ )$ | $RX(^0_2{}^1_1)$ $RY(\ \cdot\cdot\ )$ | $RX(^0_3{}^1_1)$ $RY(\ \cdot\cdot\ )$ | $RX(^1_0{}^1_1)$ $RY(\ \cdot\cdot\ )$ | $RX(^1_1{}^1_1)$ $RY(\ \cdot\cdot\ )$ | $RX(^1_2{}^1_1)$ $RY(\ \cdot\cdot\ )$ | $RX(^1_3{}^1_1)$ $RY(\ \cdot\cdot\ )$ | $RX(^2_0{}^1_1)$ $RY(\ \cdot\cdot\ )$ |
| $RX(^0_0{}^1_2)$ $RY(\ \cdot\cdot\ )$ | $RX(^0_1{}^1_2)$ $RY(\ \cdot\cdot\ )$ | $RX(^0_2{}^1_2)$ $RY(\ \cdot\cdot\ )$ | $RX(^0_3{}^1_2)$ $RY(\ \cdot\cdot\ )$ | $RX(^1_0{}^1_2)$ $RY(\ \cdot\cdot\ )$ | $RX(^1_1{}^1_2)$ $RY(\ \cdot\cdot\ )$ | $RX(^1_2{}^1_2)$ $RY(\ \cdot\cdot\ )$ | $RX(^1_3{}^1_2)$ $RY(\ \cdot\cdot\ )$ | $RX(^2_0{}^1_2)$ $RY(\ \cdot\cdot\ )$ |
| $RX(^0_0{}^1_3)$ $RY(\ \cdot\cdot\ )$ | $RX(^0_1{}^1_3)$ $RY(\ \cdot\cdot\ )$ | $RX(^0_2{}^1_3)$ $RY(\ \cdot\cdot\ )$ | $RX(^0_3{}^1_3)$ $RY(\ \cdot\cdot\ )$ | $RX(^1_0{}^1_3)$ $RY(\ \cdot\cdot\ )$ | $RX(^1_1{}^1_3)$ $RY(\ \cdot\cdot\ )$ | $RX(^1_2{}^1_3)$ $RY(\ \cdot\cdot\ )$ | $RX(^1_3{}^1_3)$ $RY(\ \cdot\cdot\ )$ | $RX(^2_0{}^1_3)$ $RY(\ \cdot\cdot\ )$ |
| $RX(^0_0{}^2_0)$ $RY(\ \cdot\cdot\ )$ | $RX(^0_1{}^2_0)$ $RY(\ \cdot\cdot\ )$ | $RX(^0_2{}^2_0)$ $RY(\ \cdot\cdot\ )$ | $RX(^0_3{}^2_0)$ $RY(\ \cdot\cdot\ )$ | $RX(^1_0{}^2_0)$ $RY(\ \cdot\cdot\ )$ | $RX(^1_1{}^2_0)$ $RY(\ \cdot\cdot\ )$ | $RX(^1_2{}^2_0)$ $RY(\ \cdot\cdot\ )$ | $RX(^1_3{}^2_0)$ $RY(\ \cdot\cdot\ )$ | $RX(^2_0{}^2_0)$ $RY(\ \cdot\cdot\ )$ |

HALFTONE DOT FORMATION

FIELD OF THE INVENTION

The present invention relates to forming halftone dots in halftone dot image reproduction by means of an image reproduction system, such as a color scanner, and more particularly, to a method of and apparatus for forming halftone dots capable of suppressing the appearance of the moiré effect while keeping the shape of the halftone dots undistorted.

BACKGROUND OF THE INVENTION

There are several methods of recording a halftone dot image necessary for producing a print from a gradated original image by means of an image reproduction system, such as a color scanner. A representative one of the methods can be seen in U.S. Pat. No. 4,350,996.

Each of those methods has the following steps. First, according to a coordinate value $(U_\alpha, V_\beta)$ of a pixel on a coordinate system $(U, V)$ of a recording film onto which a halftone dot image is to be recorded by a recording beam, a coordinate value $(X_{\alpha\beta}, Y_{\alpha\beta})$ of an imaginary screen corresponding to the recording pixel to be recorded on the recording film is computed. Second, a threshold signal corresponding to the coordinate value $(X_{\alpha\beta}, Y_{\alpha\beta})$ is read from a data storage means in which a screen pattern corresponding to the imaginary screen is written beforehand at the address $(X_{\alpha\beta}, Y_{\alpha\beta})$. Then, the readout threshold signal is compared with the corresponding image signal to consequently form a halftone dot by controlling the recording beam in accordance with the result of the comparison.

Undesirably, each of those primitive methods has a fatal drawback that a periodical interference between the imaginary screen and the locations of corresponding recording pixels causes moiré effect on a portion of a unicolor halftone dot image which should be recorded in uniformity by uniform halftone dots. In order to suppress the appearance of moiré effect, the method disclosed in U.S. Pat. No. 4,350,996 adopts a superimposition of a random number onto each address of a screen pattern corresponding to the coordinate value $(X_{\alpha\beta}, Y_{\alpha\beta})$ of the recording film. This method, however, still has a drawback that a recorded halftone dot carries a complex irregularity on its periphery as shown in FIG. 13(b). The contrasts with recordation by a method which comprises no such superimposition of a random number as shown in FIG. 13(a), whereby impaired inking is presented during subsequent printing processing.

SUMMARY OF THE INVENTION

It is an object of the present invention to provide a method of and apparatus for reproducing halftone dot images suppressing the appearance of moiré effect by disarranging the regularity of an imaginary screen in view of the fact that moiré effect is caused by a periodic interference between the imaginary screen and the locations of corresponding recording pixels. Instead, the regularity of the imaginary screen is disarranged, not pixel by pixel as observed in the said conventional method, but by unit halftone dot areas being the components of an imaginary screen each disarranged slightly at random in order to produce halftone dots free of roughness on their peripheries.

The above object can be materialized by adding random numbers $RX_{ij}$, $RY_{ij}$ respectively to screen coordinate values computed in correspondence with the location of a recording pixel when it is in a unit halftone dot area (i, j) on the imaginary screen. Adoption of an imaginary screen of such construction brings about an effective reduction of the appearance of moire effect because the discontinuity of the imaginary screen in density occurs only on the borders between adjacent unit halftone dot areas. Thus, roughness on the peripheries of halftone dots is insignificant and interference between the imaginary screen and corresponding recording pixels occurs at random.

It should be noted in the present invention that the said disarrangement of unit halftone dot areas as shown in FIG. 2 is not carried out for the whole area of an imaginary screen because such an operation requires an impracticable amount of large-scale hardware. Rather, the disarrangement is carried out for a "compartment" consisting of, for instance, 32×32 unit halftone dot areas in a matrix as shown in FIG. 7. A plurality of the thus-constructed compartment composes the imaginary screen thereby to cover the whole area of the imaginary screen.

It should be noted furthermore in the present invention that each unit halftone dot in an imaginary screen can be slightly distorted by being disarranged as shown in FIG. 9 to present distorted borderlines between unit halftone dot areas, by which a halftone dot to be produced becomes free of roughness in its periphery because no discontinuity of density on the border lines occurs.

It should be noted incidentally that the screen coordinate value, computed in accordance with a screen angle and a screen ruling to be employed, can be prestored in a table memory to be put only to an additional process, when a simpler apparatus can be used.

The above and other objects and features of the present invention can be appreciated more fully from the following detailed description when read with reference to the accompanying drawings.

BRIEF DESCRIPTION OF THE DRAWING

FIG. 10 shows a diagram of an electronically approximated imaginary screen.

FIG. 11 shows a diagram of the relation between a coordinate value of the imaginary screen of FIG. 10 and that of a normal imaginary screen.

FIG. 12 shows a schematic diagram of a data storage device into which dislocation data of each unit halftone dot area are stored.

DETAILED DESCRIPTION OF A PREFERRED EMBODIMENT OF THE INVENTION

Figure 1:
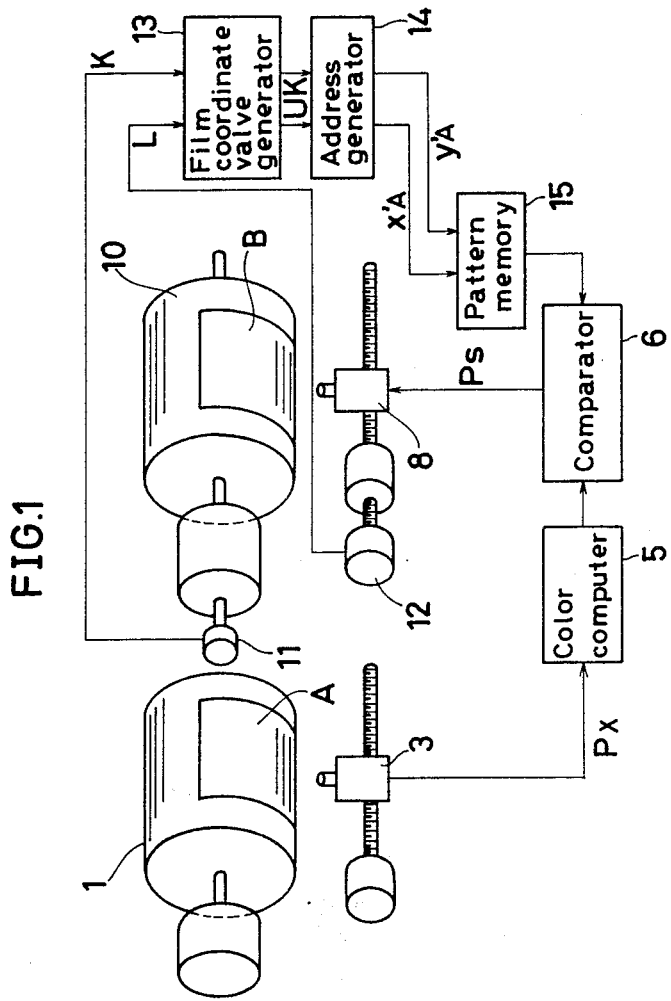
FIG. 1 shows a schematic diagram of an image reproduction system to which the method of the present invention is applied.

FIG. 1 shows a schematic diagram of an image reproduction system to which the method of forming halftone dots of the present invention is applied. In the apparatus of FIG. 1, an original A mounted on an original drum 1 is scanned by a scanning head 3 successively line by line according to a well-known method to obtain an image signal $P_x$. The image signal $P_x$ is, after undergoing necessary corrections such as color correction and gradation correction in a color computer 5, input to a comparator 6. In the meantime, there is input a threshold level signal corresponding to a density value from a pattern memory 15 to the comparator 6 as mentioned afterwards. By comparing the image signal $P_x$ with the threshold level signal for correspondency, a recording control signal $P_S$ is obtained. The recording control signal $P_S$ is input to a recording head 8 to control a recording beam, by which a halftone dot image is recorded on a photosensitive material B mounted on a recording drum 10. Since this method is mentioned in detail in U.S. Pat. No. 4,350,996, no precise description thereof is given here.

On the other hand, a rotary encoder 11 coaxially connected to the recording drum 10 and a rotary encoder (or a linear encoder) 12 moved in connection with the recording head 8 output respectively a main scanning position signal K and a sub-scanning position signal L to a film coordinate value generator 13 which generates a signal representing a film coordinate value (U, V) corresponding to each recording pixel. Then the signal of the film coordinate value (U, V) is input to an address generator 14, and converted to a screen coordinate value of an imaginary screen according to a manner mentioned afterwards to generate a reading address signal for a pattern memory 15 to which the imaginary screen is written.

Figure 2:
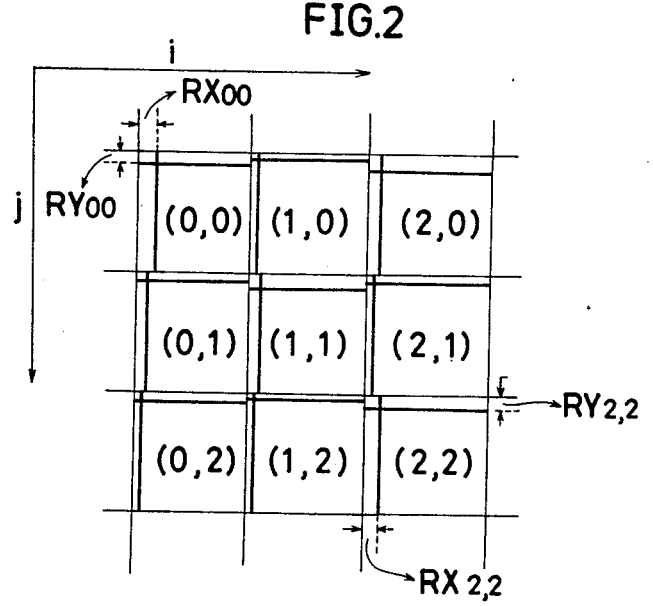
FIG. 2 shows a diagram of an imaginary screen employed in the present invention.
Figure 6:
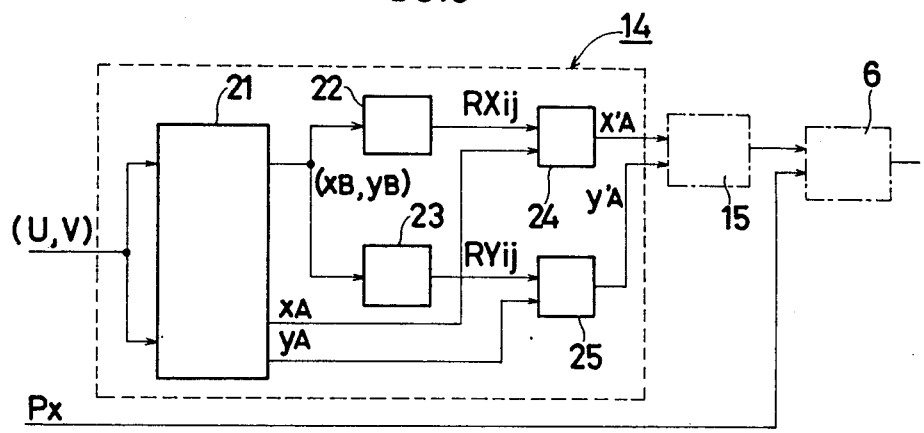
FIG. 6 shows a schematic diagram of an address generator employed in the present invention.

FIG. 6 shows an embodiment of the address generator 14 in which a computer 21, usually composed of a memory such as a ROM and an adder, is provided to compute which unit halftone dot area composing the imaginary screen includes the film coordinate value of a recording position and to compute the screen coordinate value corresponding to the film coordinate value of the recording position. There are also provided therein memories 22 and 23 to which random numbers $RX_{ij}$ and $RY_{ij}$ as shown in FIG. 2 are respectively prestored, and adders 24 and 25. In the computer 21, a conversion from a film coordinate value (U, V) to a corresponding screen coordinate value (X, Y) of an arbitrary screen angle $\theta$ is first carried out.

Figure 3:
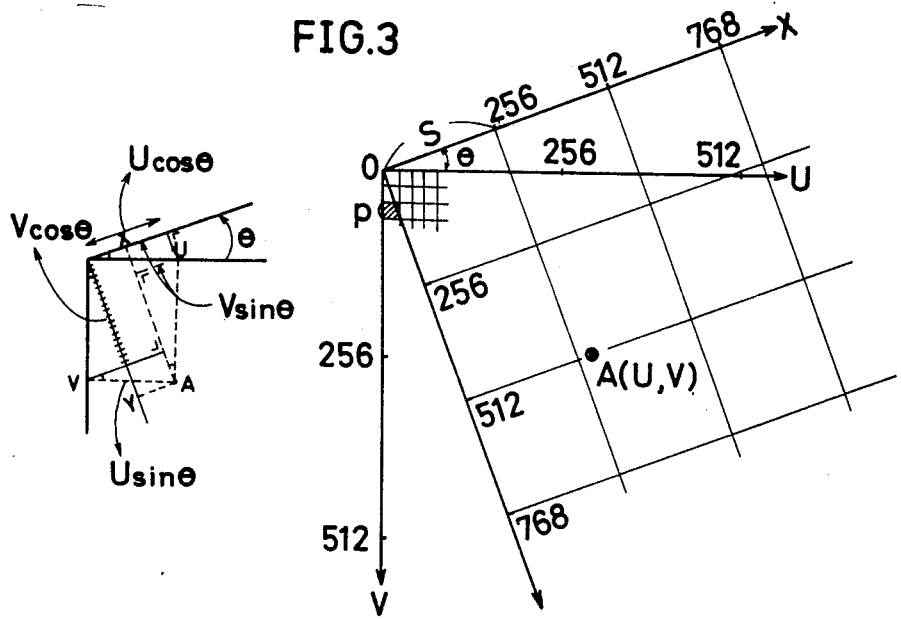
FIG. 3 shows a diagram of the relation between the coordinate system of a recording film and that of an imaginary screen.

The above-mentioned coordinate value conversion is carried out according to a manner as disclosed in U.S. Pat. No. 4,350,996. Assuming that in FIG. 3 the length of a side of a recording pixel (square) is P, the length of a unit halftone dot area is S, and the unit halftone dot area comprises 256×256 segments in a matrix, the screen coordinate value (X, Y) is expressed by equations:

$$\left. \begin{array}{l} X = (U\cos\theta - V\sin\theta)\left(P / \dfrac{S}{256}\right) \\ Y = (U\sin\theta + V\cos\theta)\left(P / \dfrac{S}{256}\right) \end{array} \right\}, \quad \text{(I)}$$

and further assuming herein that $\cos\theta(P/(S/256))=\alpha$ and further assuming herein that $\cos\theta(P/(S/256))=\beta$, the above equations (I) can be expressed by equations:

$$\left. \begin{array}{l} X = U\alpha - V\beta \\ Y = U\beta - V\alpha \end{array} \right\}. \quad \text{(II)}$$

Figure 4:
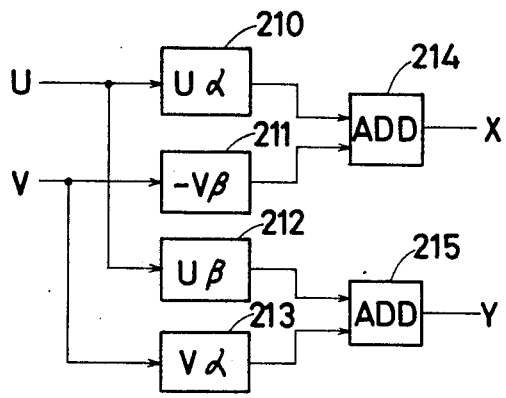
FIG. 4 shows a schematic diagram of an apparatus for carrying out a coordinate value conversion based on FIG. 3.

Since the values $\alpha$ and $\beta$ in the equations (II) have no relation to the film coordinate value (U, V), they can be previously computed at a particular screen angle $\theta$ and a screen ruling to be stored in a memory such as a ROM. FIG. 4 shows an embodiment for carrying out the coordinate value conversion, in which the coordinate value conversion in the equations (I) is carried out by reading out values $U_\alpha$, $-V_\beta$ $U_\beta$ and $V_\alpha$ respectively from the memories 210, 211, 212 and 213 and then by respectively adding the former two and the latter two in adders 214 and 215.

Figure 5:
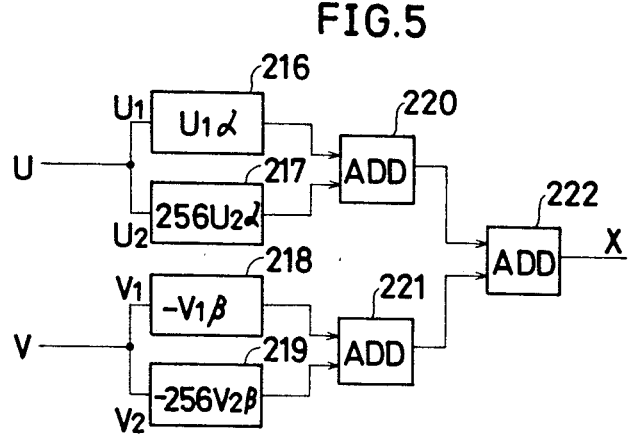
FIG. 5 shows a schematic diagram of another apparatus for carrying out a coordinate value conversion based on FIG. 3.

Assuming in this regard that the size of a film to be recorded is 58 cm × 58 cm, and the size of a recording pixel is 12 μm × 12 μm, the capacity of each of the memories 210 through 213 is approximately 50 K (kilowords), which is larger than that desired for practical use. The problem is avoided by dividing the values U and V respectively into values $U_1$, $U_2$ and $V_1$, $V_2$ and, when each of the values U and V are expressed in 16 bits, treating them as $U=U_1+256\,U_2$ and $V=V_1+256\,V_2$. In other words, by incorporating the values U and V to the equations (II), the screen coordinate values X and Y expressed by equations:

$$\left. \begin{array}{l} X = (U_1 + 256U_2)\alpha - (V_1 + 256V_2)\beta \\ Y = (U_1 + 256U_2)\beta + (V_1 + 256V_2)\alpha \end{array} \right\} \quad \text{(III)}$$

can be obtained. Since each of the values $U_1$, $U_2$, $V_1$ and $V_2$ is expressed in 8 bits in this case, memories 216 through 219 provided in an apparatus constructed as shown in FIG. 5 is allowed to have a capacity corresponding to 256 W, which is small. It should be noted in this connection that the apparatus of FIG. 5 can be applicable to the computation of either X or Y directions.

Figure 7:
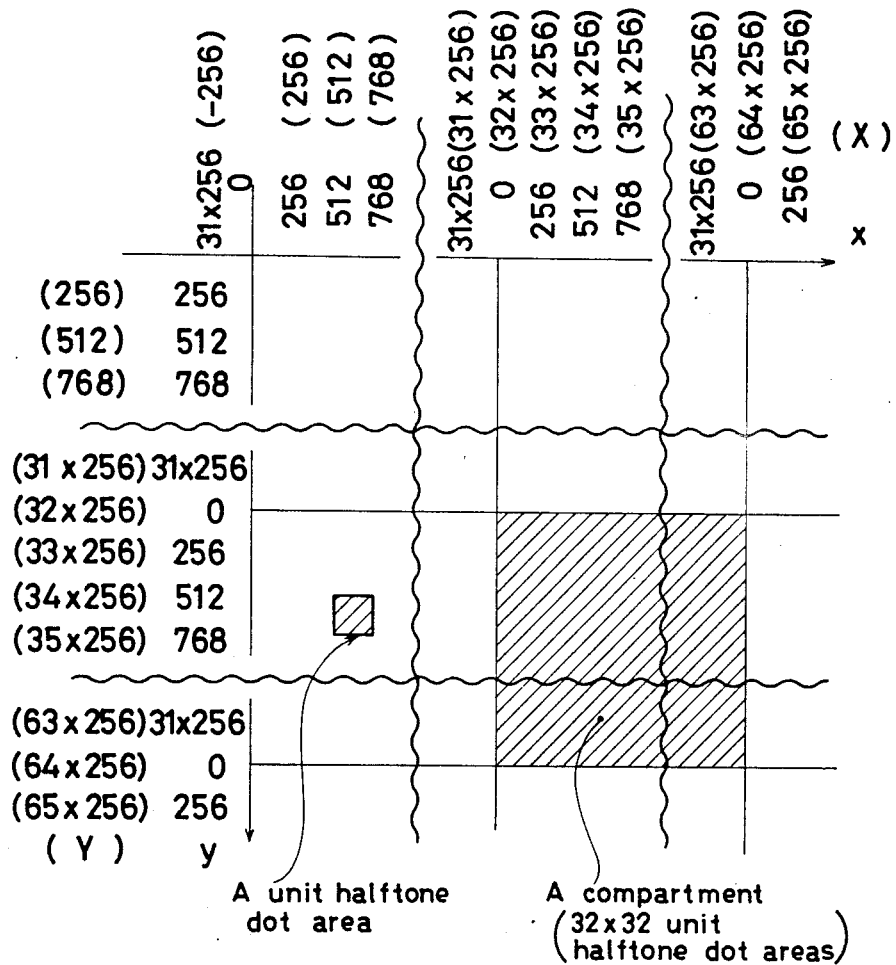
FIG. 7 shows a diagram of the relation between unit halftone dot areas and a compartment of an imaginary screen of the present invention.

In the present invention, which of 32×32 unit halftone dot areas of a screen compartment in which a recording pixel is to be included must be computed. The coordinate value (X, Y) is thus converted into a coordinate value (x, y) as shown in FIG. 7. The conversion can be expressed as:

$$x = X - 256 \times 32 i$$

and $$y = Y - 256 \times 32 j.$$

wherein i and j are integers and the values x and y must satisfy:

$$0 < x < 256 \times 32$$

and $$0 < y < 256 \times 32.$$

The above conversion can be re-expressed by equations:

$$\left.\begin{array}{l} x = Y \bmod.256 \times 32 \\ y = Y \bmod.256 \times 32 \end{array}\right\}, \quad \text{(IV)}$$

and by incorporating the equations (III) to the equations (IV), the coordinate values x and y can be obtained as:

$$x = \{(U_1 + 256U_2)\alpha - (V_1 + 256V_2)\beta\} \cdot \bmod 2^{13} \quad \text{(V)}$$

$$= \{(U_1 + 256U_2)\alpha \cdot \bmod 2^{13} +$$

$$(-V_1 - 256V_2)\beta \cdot \bmod 2^{13}\} \cdot \bmod 2^{13}$$

$$= (U_1\alpha \cdot \bmod 2^{13} + 256U_2\alpha \cdot \bmod 2^{13}) \cdot \bmod 2^{13} +$$

$$((-V_1\beta) \cdot \bmod 2^{13} + (-256V_2\beta) \cdot \bmod 2^{13} \cdot$$

$$\bmod 2^{13}\} \cdot \bmod 2^{13}$$

and $$y = \{(U_1\beta \cdot \bmod 2^{13} + 256U_2\beta \cdot \bmod 2^{13}) \cdot \quad \text{(VI)}$$

$$\bmod 2^{13} + (V_1\alpha \cdot \bmod 2^{13} + 256V_2\alpha \cdot \bmod 2^{13}) \cdot$$

$$\bmod 2^{13}\} \cdot \bmod 2^{13}$$

Figure 8:
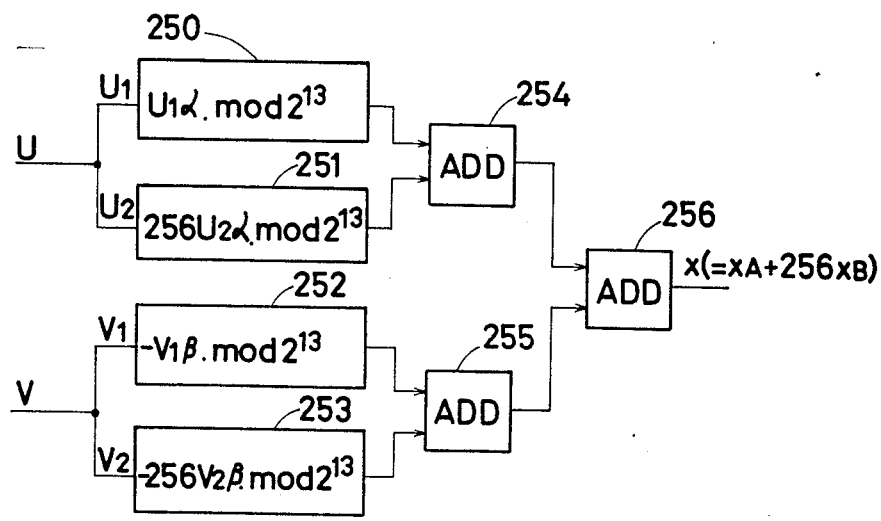
FIG. 8 shows a schematic diagram of a computer shown in FIG. 6.

FIG. 8 shows an apparatus for carrying out the coordinate system conversion corresponding to the equation (V), which has almost the same construction as that of FIG. 5 [the equation (VI) can also be computed by the same apparatus]. The difference between the two apparatus is seen in that memories 250, 251, 252 and 253 such as ROMs of FIG. 8 are prestored respectively with $U_1\alpha \cdot \bmod 2^{13}$, $256U_2\alpha \cdot \bmod 2^{13}$, $-V_1\beta \cdot \bmod 2^{13}$ and $-256V_2\beta \cdot \bmod 2^{13}$, and adders 254, 255 and 256 are each constructed so that the figures not less than $2^{13}$ is abandoned. This is because of the fact that, for instance, a value $(A+B) \cdot \bmod 2^{13}$ ($A \geq 0$, $B \geq 0$) can be computed by a hardware by simply dropping the figures not less than $2^{13}$ of the computation resultant thereof. By dividing the thus-computed value x into $x_A$ and $256x_B$ acording to the following:

$$x = \underbrace{\underbrace{2^{12}, 2^{11} \ldots 2^8}_{x_B} \; \underbrace{2^7, 2^6 \ldots 2^1, 2^0}_{x_A}}$$

the value $x_A$ becomes the x-direction coordinate value in the said unit halftone dot area, while the value $x_B$ becomes the x-direction position number in the said compartment shown in FIG. 7. The number of the position $(x_B, y_B)$ thus obtained from the computer 21 is input to the memories 22 and 23 as a reading address signal as shown in FIG. 6. In response, the random numbers $RX_{ij}$ and $RY_{ij}$ corresponding to the position number are read out from the memories 22 and 23 as mentioned before, and added to the screen coordinate values $(x_A, y_A)$ in a certain unit halftone dot area by adders 24 and 25 to be output as a screen coordinate value $(x_A', y_A')$ from the address generator 14.

Figure 9:
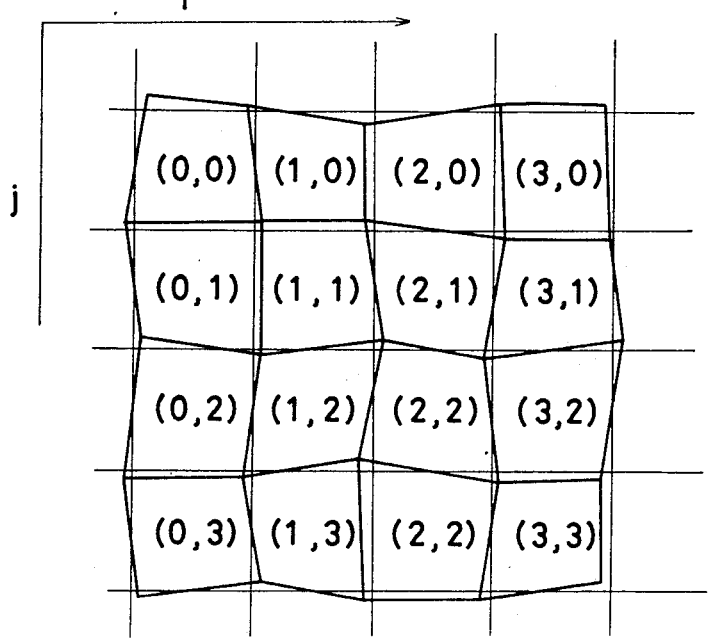
FIG. 9 shows a diagram of another imaginary screen employed in the present invention.
Figure 13B:
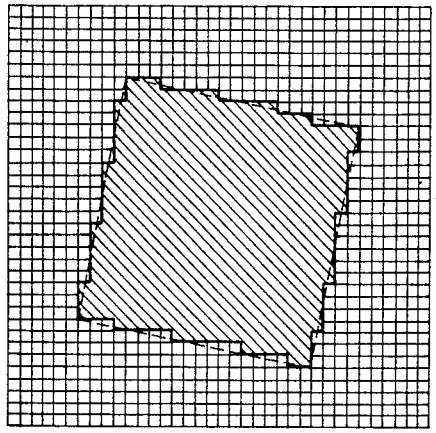
FIGS. 13(a) and 13(b) shows a detailed diagram of a halftone dot recorded by means of a conventional method.
Figure 13A:
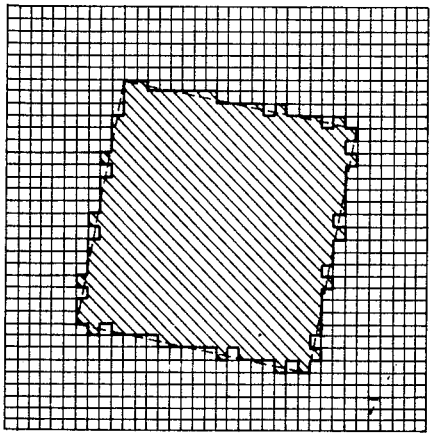

FIG. 9 shows another embodiment of the halftone dot formation method of the present invention, in which an imaginary screen comprises irregularity distorted unit halftone dot areas. In this connection, since such a distorted imaginary screen is difficult to be produced electronically, the present invention adopts an approximation as shown in FIG. 10.

The approximation is carried out in such a manner that segments of a normal unit halftone dot area are rearranged so as to approximate to a distorted unit halftone dot area. Although in the example of FIG. 10 each of the segments has each side ¼ in length of the corresponding side of the unit halftone dot area, the size of each segment can, of course, be reduced to obtain a finer approximation.

The rearrangement of each segment is determined by x and y direction dislocation quantities RX and RY from the original position thereof on the normal unit halftone dot area, and the density value corresponding to a screen coordinate value P (x, y) of the distorted unit halftone dot area is as same as that corresponding to a screen coordinate value P'(x-PX, y-PY) of the normal unit halftone dot area as shown in FIG. 11. For this reason, an approximated screen pattern can be obtained by converting the screen coordinate value (x, y) of the normal screen pattern into the screen coordinate value (x-PX, y-PY) of the approximated screen pattern, when the screen pattern itself is untouched.

The above-mentioned theory can be easily put into practice by previously storing into memories the values RX and RY corresponding to each of, for example, $32 \times 32$ unit halftone dot areas in a compartment and adding them to the corresponding normal coordinate values. It should be noted in this regard that each compartment of an imaginary screen comprises identically rearranged (distorted) $32 \times 32$ unit halftone dot areas in the halftone dot generation method of the present invention as seen in the first embodiment, because there is necessitated a vast amount of capacity to prestore the values RX and RY for the whole area of a recording film.

FIG. 12 shows a schematic diagram of distinct values RX and RY for each of 16 segments of a unit halftone dot area comprising a compartment being stored in a memory, in which the values RX and RY are expressed with suffixes i, j, k and as RX $(_k{}^i{}_l{}^j)$ and RY $(_k{}^i{}_l{}^j)$.

In the halftone dot generation method of the present invention, the suffix values (i, j) and (k, l) are used as addresses for reading out the corresponding values RX and RY which are subsequently added to the screen coordinate value $(x_A, y_A)$ as mentioned on the first embodiment. The suffix values (i, j) and (k, l) can be obtained, for instance, from the values x and y obtained by the address generator 14 of the first embodiment according to the following:

$$x = \underbrace{\underbrace{2^{12}, 2^{11} \ldots 2^8}_{i} \; \underbrace{2^7, 2^6 \ldots 2^0}_{k}}$$

and

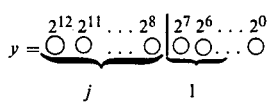

It is easily understood in the field of image reproduction that the structure of an apparatus for realizing the above method is to be basically as same as the first embodiment shown in FIG. 6 in which only the data stored and the addresses in the memories 22 and 23 are different.

As mentioned above, the halftone dot generation means of the present invention, in which an imaginary screen comprising a plurality of compartments each of which is composed of, for instance, 32×32 unit halftone dot areas in a matrix each of which unit halftone dot areas distorted slightly at random is used, brings forth the effects as follows:

In comparison with the conventional method in which a random number is imposed onto each recording pixel, the method of the present invention is capable of forming a halftone dot whose peripheral area is less rough, which leads to smoothed inking in printing and effective reduction of the appearance of moiré effect.

Furthermore, using an imaginary screen as disclosed in the second embodiment brings forth an improvement on reducing a discontinued density distribution appearing around the boarder lines between unit halftone dot areas, which leads to more strict reduction of the appearance of moire effect.

It should be noted incidentally that the method of the present invention, described on a partiuclar case when applied to a color scanner, can also be applied to other image reproduction systems such as a monochrome scanner, a layout scanner and a electronic photocomposer.

We claim:

1. A method of forming a halftone dot image on a photosensitive film by means of a recording beam controlled by a signal obtained by comparing an image signal obtained from an original with a corresponding threshold value signal read out from a screen memory in which an imaginary screen of a certain screen angle and screen ruling is stored, comprising the steps of:
   (a) obtaining a film coordinate value corresponding to a recording pixel;
   (b) obtaining a screen coordinate value of a certain screen angle corresponding to each recording pixel and a screen coordinate value of the same screen angle corresponding to a unit halftone dot area composed of a certain number of recording pixels arranged in a matrix in main and sub-scanning directions according to the said film coordinate value;
   (c) generating random numbers to be imposed on the screen coordinate value of the unit halftone dot area according to the screen coordinate value thereof;
   (d) obtaining main and sub-scanning reading addresses of the screen memory respectively by summing the main scanning direction random number and the main scanning direction coordinate value of the corresponding recording pixel and by summing the sub-scanning direction random number and the sub-scanning direction coordinate value of the corresponding recording pixel; and
   (e) reading out a threshold value corresponding to the summed values of both the directions from the screen memory.

2. A method as recited in claim 1 in which identical random numbers for the recording pixels in a unit halftone dot area are repeatedly applied to the recording pixels in a specific number of unit halftone dot areas arranged in a matrix in the main and sub-scanning directions comprising a compartment by periodically using identical screen coordinate values corresponding to the recording pixels in a specific unit halftone dot area.

3. A method as recited in claim 2 in which the main scanning direction screen coordinate value corresponding to each of the recording pixels in a unit halftone dot area is expressed by low-order A bits identified by the exponent A of a main scanning direction pixel number (screen ruling) $2^A$ in the unit halftone dot area and high-order B bits identified by the exponent B of a specific number $2^B$ of unit halftone dots in the compartment; the sub-scanning direction screen coordinate value corresponding to each of the recording pixels in the unit halftone dot area is expressed by low-order A bits and high-order B bits identified similarly as above; and an identical sequence of screen coordinate values corresponding to the recording pixels in a specific unit halftone dot area is periodically used for the recording pixels in B unit halftone dot areas.

4. A method as recited in claim 1 wherein:

$$U = U_1 + 2^A U_2 (0 \leq U_1 < 2^A),$$

and $$V = V_1 + 2^A V_2 (0 \leq V_1 < 2^A)$$

wherein U is a sub-scanning direction coordinate value obtained from a film coordinate value generation means, and V is a main scanning direction coordinate value obtained from a film coordinate value generation means; and $$\cos \theta (P/(S/A)) = \alpha,$$

and $$\sin \theta (P/(A/A)) = \beta$$

wherein $\theta$ is a screen angle, S is the length of a side of a unit halftone dot area, and P is the length of a side of a recording pixel; and B is the number of unit halftone dot areas in a compartment, the step (b) further comprising the steps of:
   (1) obtaining $U_1 \alpha \bmod 2^{A+B}$ from $U_1$;
   (2) obtaining $256 \alpha \bmod 2^{A+B}$ from $U_2$;
   (3) obtaining $-V_1 \beta \bmod 2^{A+B}$ from $V_1$;
   (4) obtaining $-256 V_2 \beta \bmod 2^{A+B}$ from $V_2$;
   (5) summing the resultants obtained in the steps (1) and (2);
   (6) summing the resultants obtained in the steps (3) and (4);
   (7) outputting a screen coordinate value of a sub-scanning direction factor corresponding to each recording pixel expressed by low-order A bits by summing the resultants obtained in the steps (5) and (6), and a screen coordinate value of the subscanning direction factor corresponding to a unit halftone dot area expressed by high-order B bits;
   (8) obtaining $U_1 \beta \bmod 2^{A+B}$ from $U_1$;

(9) obtaining $2^A U_2 \beta$ mod $2^{A+B}$ from $U_2$;
(10) obtaining $V_1 \alpha$ mod $2^{A+B}$ from $V_1$;
(11) obtaining $2^A V_2$ mod $2^{A+B}$ from $V_2$;
(12) summing the resultants obtained in the steps (8) and (9);
(13) summing the resultants obtained in the steps (10) and (11); and
(14) outputting a screen coordinate value of the main scanning direction factor corresponding to each recording pixel expressed by low-order A bits by summing the resultants obtained in the steps (12) and (13), and a screen coordinate value of the main scanning direction factor corresponding to the unit halftone dot area expressed by high-order B bits to periodically use an identical screen coordinate value for every $2^B$ halftone dot areas.

5. A method of forming a halftone dot image on a photosensitive film by means of a recording beam controlled by a signal obtained by comparing an image signal obtained from an original with a corresponding threshold value signal read out from a screen memory in which an imaginary screen of a certain screen angle and screen ruling is stored, comprising the steps of:
 (a) obtaining a film coordinate value corresponding to a recording pixel;
 (b) obtaining a screen coordinate value of a certain screen angle corresponding to each recording pixel, a screen coordinate value of the same screen angle corresponding to a unit halftone dot area composed of a certain number of recording pixels arranged in a matrix in main and sub-scanning directions, and a screen coordinate value corresponding to each segment composing the unit halftone dot area according to the said film coordinate value;
 (c) generating random numbers to be imposed on the screen coordinate value corresponding to each segment according to the screen coordinate value corresponding to the recording pixels in a specific unit halftone dot area;
 (d) obtaining main and sub-scanning reading addresses of the screen memory respectively by summing the main scanning direction random number and the main scanning direction coordinate value of the corresponding recording pixel and by summing the sub-scanning direction random number and the sub-scanning coordinate value of the corresponding recording pixel; and
 (e) reading out a threshold value corresponding to the summed values of both the directions from the screen memory.

6. A method as recited in claim 5 in which identical random numbers are repeatedly applied to the segments arranged in a matrix in the main and the sub-scanning directions in a unit halftone dot area by periodically using identical screen coordinate values corresponding to the recording pixels in a specific unit halftone dot area.

7. An apparatus for forming a halftone dot image on a photosensitive film by means of a recording beam controlled by a signal obtained by comparing an image signal obtained from an original with a corresponding threshold value signal read out from a screen memory in which an imaginary screen of a certain screen angle and screen ruling is stored, comprising:
 (a) film coordinate value generation means for obtaining a film coordinate value corresponding to a recording pixel;
 (b) coordinate value conversion means for obtaining a screen coordinate value of a certain screen angle corresponding to each recording pixel and a screen coordinate value of the same screen angle corresponding to a unit halftone dot area composed of a certain number of recording pixels arranged in a matrix in the main and the sub-scanning directions according to the said film coordinate value;
 (c) random number generation means for generating random numbers to be imposed on the screen coordinate value of the unit halftone dot area according to the screen coordinate value of the unit halftone dot area; and
 (d) summing means for obtaining main and sub-scanning reading addresses of the screen memory respectively by summing the main scanning direction random number and the main scanning direction coordinate value of the corresponding recording pixel and by summing the sub-scanning direction random number and the sub-scanning direction coordinate value of the corresponding recording pixel.

8. An apparatus as recited in claim 7 in which the main scanning direction screen coordinate value corresponding to each of the recording pixels in a unit halftone dot area is expressed by low-order A bits identified by the exponent A of a main scanning direction pixel number (screen ruling) $2^A$ in the unit halftone dot area and high-order B bits identified by the exponent B of a specific number $2^B$ of unit halftone dots in the compartment; the sub-scanning direction screen coordinate value corresponding to each of the recording pixels in the unit halftone dot area is expressed by low-order A bits and high-order B bits identified similarly as above; the A bits comprising highest C bits expressed by the exponent C of the number $2^C$ of the said segments; and an identical sequence of screen coordinate values corresponding to the recording pixels in a specific unit halftone dot area being periodically used for the segments in a certain number of unit halftone dot rea.

9. An apparatus as recited in claim 7, wherein:

$$U = U_1 + 2^1 U_2 (0 \leq U_1 < 2^1),$$

and $$V = V_1 + 2^A V_2 (0 \leq V_1 < 2^A)$$

wherein U is a sub-scanning direction coordinate value obtained from a film coordinate value generation means, and V is a main scanning direction coordinate value obtained from a film coordinate value generation means;

$$\cos \theta (P/(S/A)) = \alpha,$$

and $$\sin \theta (P/(S/A)) = \beta$$

wherein $\theta$ is a screen angle, S is the length of a side of a unit halftone dot area, and P is the length of a side of a recording pixel; and B is the number of unit halftone dot areas in a compartment, the coordinate value conversion means further comprising:
 (1) a first table memory for outputting $U_1 \alpha$ mod $2^{A+B}$ according to an input $U_1$;

(2) a second table memory for outputting 256 $U_2\alpha$ mod $2^{A+B}$ according to an input $U_2$;

(3) a third table memory for outputting $-V_1\beta$ mod $2^{A+B}$ according to an input $V_1$;

(4) a fourth table memory for outputting $-256\ V_2\beta$ mod $2^{A+B}$ according to an input $V_2$;

(5) a first summing means for summing the outputs obtained from the first and the second table memories;

(6) a second summing means for summing the outputs obtained from the third and the fourth table memories;

(7) third summing means for outputting a screen coordinate value of the sub-scanning direction factor corresponding to each recording pixel expressed by low-order A bits by summing resultants obtained from the first and the second summing means, and a screen ccordinate value of the sub-scanning direction factor corresponding to a unit halftone dot area expressed by high-order B bits;

(8) a fifth table memory for outputting $U_1\beta$ mod $2^{A+B}$ according to $U_1$;

(9) a sixth table memory for outputting $2^A U_2\beta$ mod $2^{A+B}$ according to $U_2$;

(10) a seventh table memory for outputting $V_1$ mod $2^{A+B}$ according to $V_1$;

(11) an eighth table memory for outputting $2^A V_2$ mod $2^{A+B}$ according to $V_2$;

(12) a fourth summing means for summing the outputs obtained from the fifth and the sixth table memories;

(13) a fifth summing means for summing the outputs obtained from the seventh and the eighth table memories;

(14) a sixth summing means for outputting a screen coordinate value of the main scanning direction factor corresponding to each recording pixel expressed by low-order A bits by summing the resultants obtained from the fourth and fifth summing means, and a screen coordinate value of the main scanning direction factor corresponding to the unit halftone dot area expressed by high-order B bits to periodically use an identical screen coordinate value for each $2^B$ halftone dot areas.

10. An apparatus as recited in claim 9 in which the said random number generation means is a table memory into which random numbers of the main and the sub-scanning direction factors for the recording pixels in a certain number of unit halftone dot areas are stored.

11. An apparatus for forming a halftone dot image on a photosensitive film by means of a recording beam controlled by a signal obtained by comparing an image signal obtained from an original with a corresponding threshold value read out from a screen memory in which an imaginary screen of a certain screen angle and screen ruling is stored, comprising:

(a) film coordinate value generation means for obtaining a film coordinate value corresponding to a recording pixel;

(b) coordinate value conversion means for obtaining a screen coordinate value of a certain screen angle corresponding to each recording pixel, a screen coordinate value of the same screen angle corresponding to a unit halftone dot area composed of a certain number of recording pixels arranged in a matrix in the main and the sub-scanning directions, and a screen coordinate value corresponding to each segment composing the unit halftone dot area according to the said film coordinate value;

(c) random number generation means for generating random numbers to be imposed on the screen coordinate value corresponding to each segment according to the screen coordinate value corresponding to the recording pixels comprised in a specific unit halftone dot area; and (d) summing means for obtaining main and sub-scanning reading addresses of the screen memory respectively by summing the main scanning direction random number and the main scanning directon coordinate value of the corresponding recording pixel and by summing the sub-scanning direction random number and the sub-scanning coordinate value of the corresponding recording pixel.

* * * * *